*(12)* United States Patent
Chuang et al.

(10) Patent No.: US 8,476,842 B2
(45) Date of Patent: Jul. 2, 2013

(54) DRIVING DEVICE FOR LED MODULE

(75) Inventors: Chao-Hsuan Chuang, Hsinchu County (TW); Hung-Che Chou, Hsinchu County (TW); Sheng-Chieh Wu, Hsinchu County (TW); Pao-Chuan Lin, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 429 days.

(21) Appl. No.: 12/962,657

(22) Filed: Dec. 8, 2010

(65) Prior Publication Data

US 2012/0146515 A1 Jun. 14, 2012

(51) Int. Cl.
*H05B 37/02* (2006.01)
(52) U.S. Cl.
USPC ................. 315/291; 315/209 R; 315/308
(58) Field of Classification Search
USPC ................. 315/209 R, 291, 307, 308
See application file for complete search history.

(56) References Cited

U.S. PATENT DOCUMENTS

| | | | |
|---|---|---|---|
| 6,674,274 B2 * | 1/2004 | Hobrecht et al. | 323/285 |
| 7,321,206 B2 | 1/2008 | Kang et al. | |
| 7,649,325 B2 * | 1/2010 | McIntosh et al. | 315/291 |
| 8,018,170 B2 * | 9/2011 | Chen et al. | 315/192 |
| 8,378,589 B2 * | 2/2013 | Kuo et al. | 315/291 |
| 2005/0110469 A1 * | 5/2005 | Inaba et al. | 323/222 |

* cited by examiner

*Primary Examiner* — Thuy Vinh Tran
(74) *Attorney, Agent, or Firm* — Jianq Chyun IP Office

(57) ABSTRACT

A driving device for a LED module is provided. The driving device for the LED module includes a voltage converting unit, a LED module voltage detecting unit, and a switching signal generation unit. The voltage converting unit produces a driving voltage to drive the LED module according to a switching signal. The LED module voltage detecting unit divides the driving voltage to produce a comparison voltage. The switching signal generation unit receives the comparison voltage by a fault detection pin and compares a reference voltage and the comparison voltage to enable or disable the switching signal. After the switching signal is disabled, the switching signal generation unit further pulls up a voltage level of the fault detection pin to a logic high level voltage, so as to produce a fault notification signal to let the fault detection pin also have a function for fault notification.

14 Claims, 7 Drawing Sheets

DRIVING DEVICE FOR LED MODULE

BACKGROUND

1. Field of the Invention

The invention relates to a driving device for a light emitting diode (LED) module. Particularly, the invention relates to a driving device for a LED module, in which a fault detection pin has a fault notification function.

2. Description of Related Art

Along with a general trend of multifunction of electronic devices, circuits of multiple functions are integrated into a same integrated circuit or a system. To provide different power supplies to different functional circuits in the same integrated circuit or the system, a so-called direct current to direct current (DC-DC) power converter is developed. The commonly used DC-DC power converters are grouped into booster DC-DC power converters and buck DC-DC power converters.

Taking a driving device used for driving a backlight module constructed by light-emitting diodes (LEDs) as an example, such type of the backlight module drives a plurality of LED strings, and each LED string includes a plurality of LEDs connected in series. Referring to FIG. 1, FIG. 1 is a diagram illustrating a conventional driving circuit of a LED module 10. The LED module 10 includes a LED string 110 and a driving device 120, and the LED string 110 includes a plurality of LEDs LED. A voltage converting unit 130 in the driving device 120 is a DC-DC voltage converter, which receives an input voltage Vin, and produces a driving voltage $V_{DR}$ according to a switching signal $S_{SW}$ provided by a switching signal driving unit 140, so as to drive the LED string 110.

The conventional driving device 120 of the LED module 10 generally has a fault detection pin $P_{fault}$, so that when a part of the LEDs LED in the LED string 110 is malfunctioned, the driving device 120 can automatically stop driving the LED string 110, so as to avoid a damage of the LED string 110 or the driving device 120 due to overheat of the driving device 120 or continuous power-supplying of the voltage converting unit 130. In other words, a comparison voltage $V_{CP}$ on the fault detection pin $P_{fault}$ is obtained by dividing the driving voltage $V_{DR}$ by the LED string 110, a resistor R1 and a resistor R2. When all of the LEDs LED in the LED string 110 can normally work without malfunction, most of the driving voltage $V_{DR}$ is consumed in the LEDs LED, so that a voltage value of the comparison voltage $V_{CP}$ is smaller than a threshold voltage of a switch 150, and therefore the switch 150 is in a turned-on state. In this way, a PWM pin of the switching signal driving unit 140 can receive a pulse width modulation signal PWM_signal through the switch 150, so that the switching signal $S_{SW}$ becomes the pulse width modulation signal PWM_signal, and the voltage converting unit 130 can continually drive the LED string 110 according to the pulse width modulation signal PWM_signal.

Comparatively, when a part of the LEDs LED is damaged or a voltage value of the driving voltage $V_{DR}$ is excessively high due to other reasons, the voltage value of the comparison voltage $V_{CP}$ can be greater than the threshold voltage of the switch 150, so that the switch 150 is switched from the turned-on state to a turned-off state. In this way, the PWM pin of the switching signal driving unit 140 receives a ground voltage $V_{SS}$ through a resistor R3, and the switching signal $S_{SW}$ becomes a DC voltage signal (for example, the switching signal $S_{SW}$ becomes a logic low level signal), and accordingly the voltage converting unit 130 cannot continually drive the LED string 110, so that the driving circuit 120 may have a function for detecting fault of the LEDs LED and a circuit protection function.

However, a reason that causes fault of the LED module 10 is not only the damage of the LEDs LED, and if a circuit of the driving device 120 is damaged, it may also cause fault of the LED module 10. Therefore, when a maintenance personnel detects the fault of the LED module 110, the maintenance personnel has to detect the circuits of the LED string 110 and the driving device 120 one-by-one, and cannot obtain the damage information through the fault detection pin in the LED module 10.

SUMMARY OF THE INVENTION

The invention is directed to a driving device for a light-emitting diode (LED) module, the driving device for the LED module has a fault detection pin, and the fault detection pin can detect whether the LED module is malfunctioned according to a comparison voltage, and has a function for fault notification when the LED module is malfunctioned.

On the other hand, the invention is directed to a LED module, in which fault detection pins of a plurality of LED driving devices are integrated into a multi fault detection pin, and when a part of LEDs are damaged, the LED module can immediately perform fault notification.

The invention provides a driving device for a LED module. The driving device for the LED module includes a voltage converting unit, a LED module voltage detecting unit, and a switching signal generation unit. The voltage converting unit is coupled to the LED module, and receives a switching signal and produces a driving voltage according to the switching signal to drive the LED module. The LED module voltage detecting unit is also coupled to the LED module. The LED module voltage detecting unit detects the driving voltage on the LED module, and performs a voltage-dividing operation according to the driving voltage to produce a comparison voltage. The switching signal generation unit is coupled to the voltage converting unit and the LED module voltage detecting unit. The switching signal generation unit has a fault detection pin for receiving the comparison voltage, and the switching signal generation unit compares a reference voltage and the comparison voltage to enable or disable the switching signal. After the switching signal is disabled, the switching signal generation unit further pulls up a voltage level of the fault detection pin to a logic high level voltage, so as to produce a fault notification signal.

In an embodiment of the invention, the switching signal is a pulse width modulation signal when the switching signal is enabled, and the switching signal is a direct current (DC) voltage signal when the switching signal is disabled.

In an embodiment of the invention, the switching signal generation unit includes a switching signal control unit and a switching signal driving unit. The switching signal control unit is coupled to the fault detection pin for receiving the comparison voltage, and the switching signal control unit compares the reference voltage and the comparison voltage to produce a control signal. The switching signal driving unit is coupled to the switching signal control unit, and the switching signal driving unit enables or disables the switching signal according to the control signal. After the switching signal is disabled, the switching signal control unit further pulls up the voltage level of the fault detection pin to the logic high level voltage, so as to produce the fault notification signal.

According to another aspect, the invention provides a LED module including a plurality of LED strings, a plurality of LED driving devices and a plurality of LEDs, wherein each LED driving device is correspondingly coupled to one of the LED strings. Each LED driving device includes a voltage converting unit, a LED module voltage detecting unit, and a switching signal generation unit. The voltage converting unit is coupled to the corresponding LED string, and receives a switching signal and produces a driving voltage according to the switching signal to drive the corresponding LED string. The LED module voltage detecting unit is coupled to the corresponding LED string. The LED module voltage detecting unit detects the driving voltage on the LED string, and performs a voltage-dividing operation according to the driving voltage to produce a comparison voltage. The switching signal generation unit is coupled to the voltage converting unit and the LED module voltage detecting unit. The switching signal generation unit has a fault detection pin for receiving the comparison voltage, and the switching signal generation unit compares a reference voltage and the comparison voltage to enable or disable the switching signal. After the switching signal is disabled, the switching signal generation unit further pulls up a voltage level of the fault detection pin to a logic high level voltage, so as to produce a fault notification signal. One end of each LED is coupled to the corresponding fault detection pin, and other ends of the LEDs are commonly coupled to a multi fault detection pin, and the multi fault detection pin produces a multi fault detection signal.

According to the above descriptions, an embodiment of the invention provides a driving device for a LED module, and the driving device for the LED module has a fault detection pin, and compares voltage levels of the reference voltage and the comparison voltage to detect whether the LED module is malfunctioned. When the LED module is malfunctioned, the voltage level of the fault detection pin is pulled up to the logic high level voltage, so as to produce the fault notification signal, so that the fault detection pin also have a function for fault notification.

Moreover, the LED module of another embodiment has a plurality of LED driving devices, and each LED driving device includes the fault detection pin having a function for fault notification. The LED module integrates the fault detection pins of a plurality of the LED driving devices into a multi fault detection pin, so that when a part of the LEDs is damaged, the LED module can immediately execute the fault notification.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
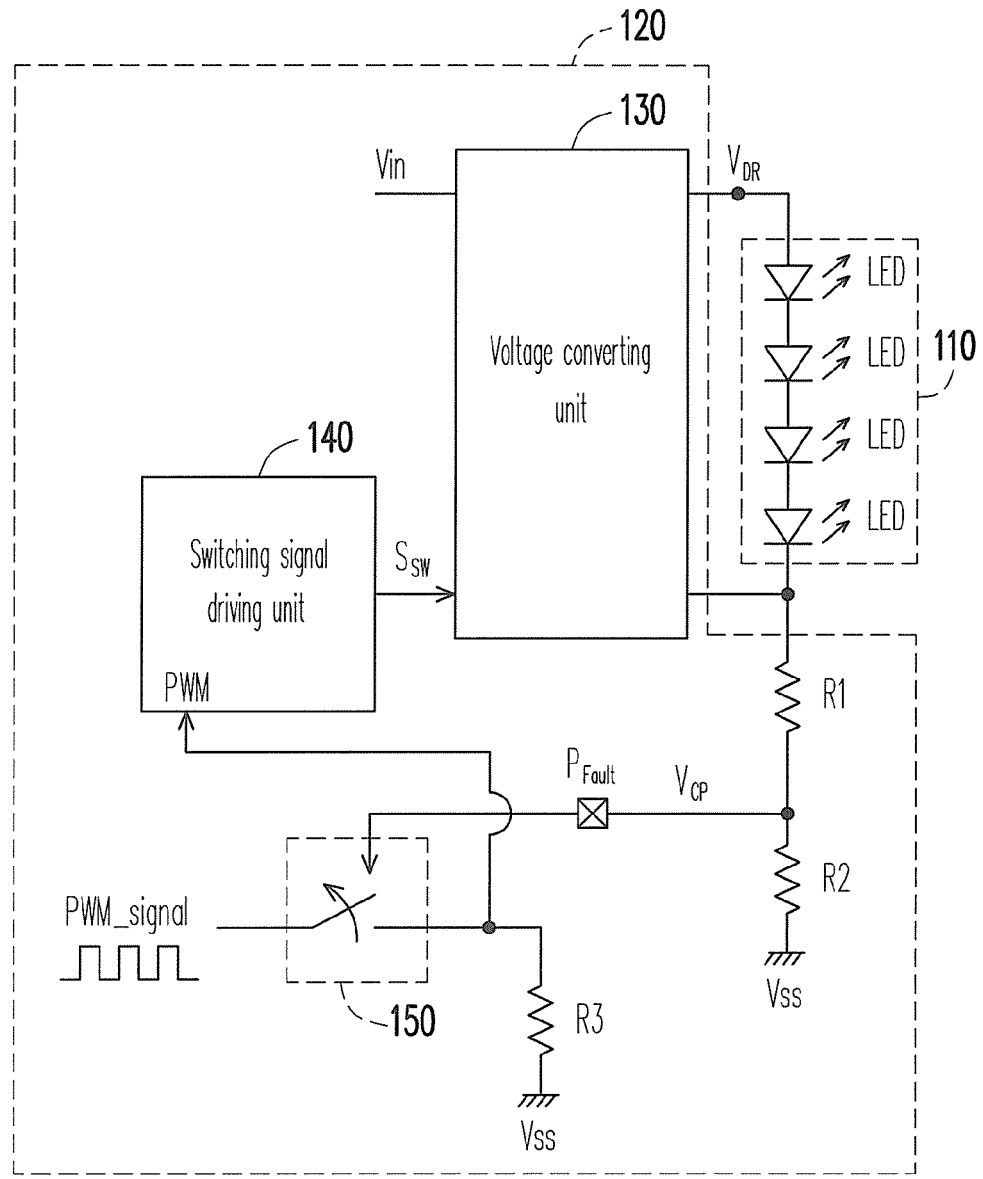
FIG. 1 is diagram illustrating a conventional driving circuit of a light emitting diode (LED) module.

Reference will now be made in detail to the present preferred embodiments of the invention, examples of which are illustrated in the accompanying drawings. Wherever possible, the same reference numbers are used in the drawings and the description to refer to the same or like parts.

Figure 2:
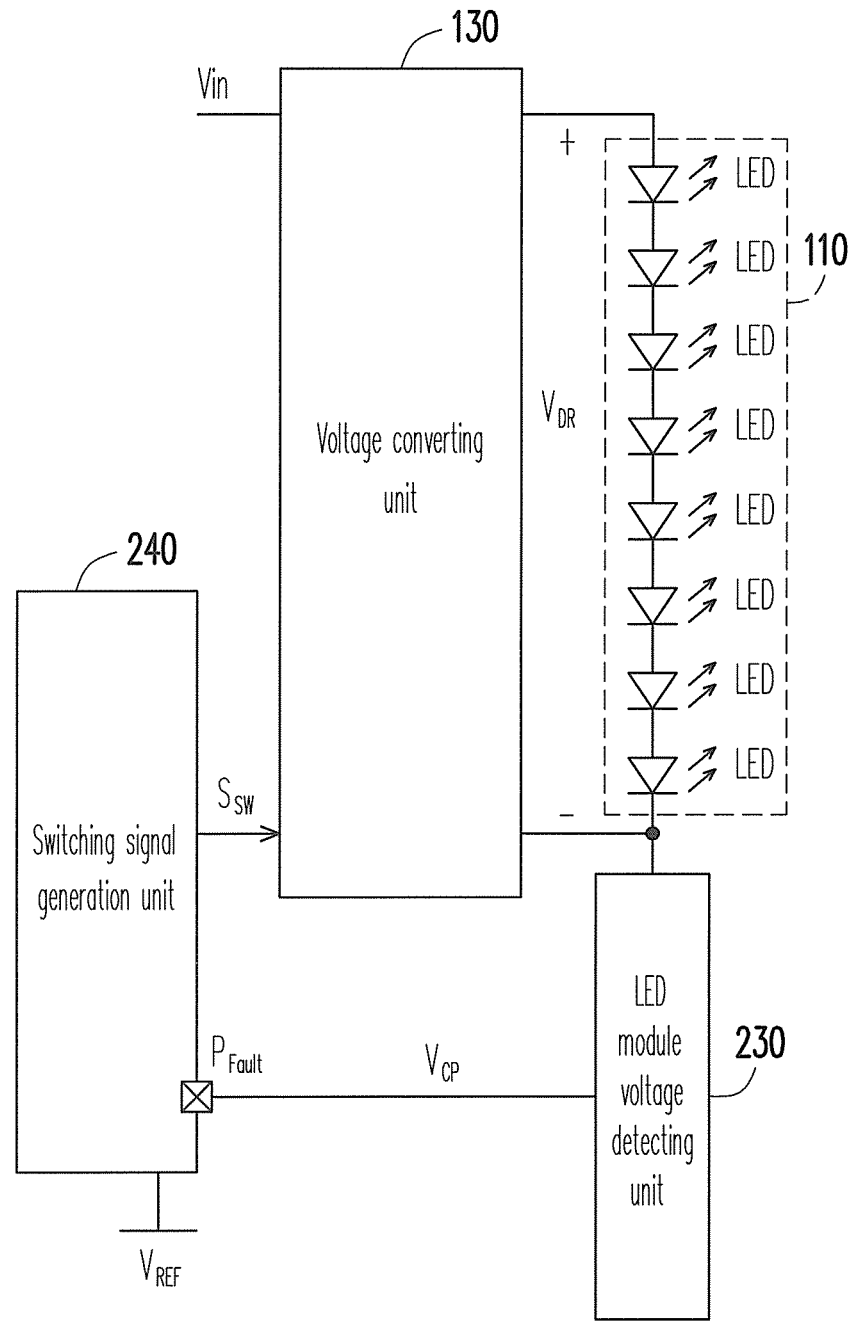
FIG. 2 is a block diagram illustrating a LED module driving device according to a first embodiment of the invention.

Referring to FIG. 2, FIG. 2 is a block diagram illustrating a LED module driving device 20 according to a first embodiment of the invention. As shown in FIG. 2, the LED module driving device 20 is used for driving a LED string 110, and the LED module driving device 20 includes a voltage converting unit 130, a LED module voltage detecting unit 230, and a switching signal generation unit 240.

Referring to FIG. 2 again, in the present embodiment, the voltage converting unit 130 is, for example, a direct current to direct current (DC-DC) power converter. The voltage converting unit 130 receives an input voltage Vin, and generates a driving voltage $V_{DR}$ according to a switching signal $S_{SW}$ provided by the switching signal generation unit 240, so as to drive the LED string 110. In the present embodiment, when the switching signal $S_{SW}$ is a pulse width modulation (PWM) signal, the voltage converting unit 130 generates the driving voltage $V_{DR}$ to drive the LED string 110. Comparatively, when the switching signal $S_{SW}$ is a DC voltage signal (for example, the switching signal $S_{SW}$ is a logic low level signal), the voltage converting unit 130 stops a voltage converting operation. It should be noticed that those skilled in the art can change a type of the voltage converting unit 130 according to an actual design requirement, so that the invention is not limited to the type of the voltage converting unit 130.

The LED module voltage detecting unit 230 is also coupled to the LED string 110. The LED module voltage detecting unit 230 detects the driving voltage $V_{DR}$ on the LED string 110, and performs a voltage-dividing operation according to the driving voltage $V_{DR}$ to produce a comparison voltage $V_{CP}$. The switching signal generation unit 240 is coupled to the voltage converting unit 130 and the LED module voltage detecting unit 230. The switching signal generation unit 240 has a fault detection pin $P_{Fault}$ for receiving the comparison voltage $V_{CP}$, and the switching signal generation unit 240 compares a reference voltage $V_{REF}$ and the comparison voltage $V_{CP}$ to enable or disable the switching signal $S_{SW}$. In the present embodiment, the switching signal $S_{SW}$ is a PWM signal when it is enabled, and the switching signal $S_{SW}$ is a DC voltage signal (for example, the switching signal $S_{SW}$ is a logic low level signal) when it is disabled. Then, after the switching signal $S_{SW}$ is disabled, the switching signal generation unit 240 may further pull up a voltage level of the fault detection pin $P_{Fault}$ to a logic high level voltage, so as to produce a fault notification signal.

Figure 3:
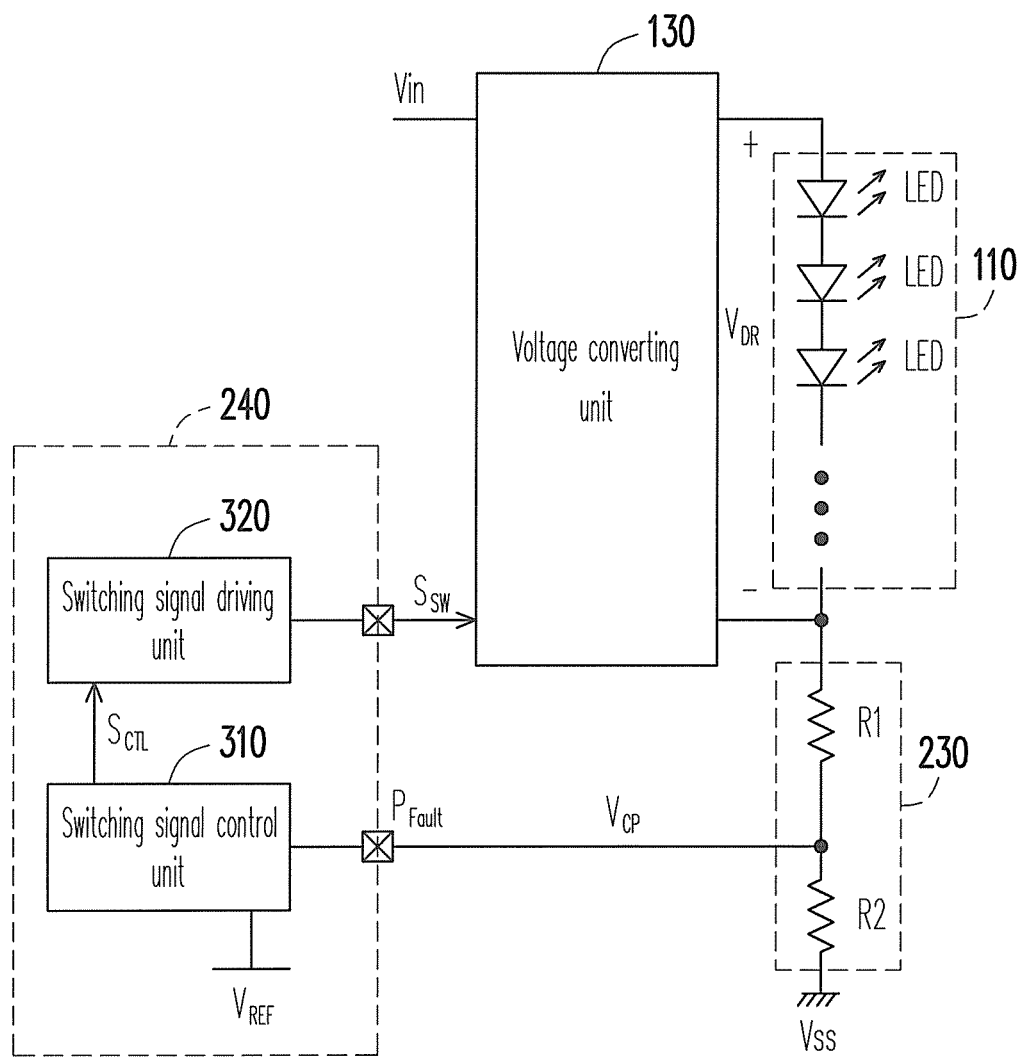
FIG. 3 is a detailed block diagram illustrating a LED module driving device according to a first embodiment of the invention.

Functional structures of the LED module voltage detecting unit 230 and the switching signal generation unit 240 are introduced below. Referring to FIG. 3, FIG. 3 is a detailed block diagram illustrating the LED module driving device 20 according to the first embodiment of the invention. In the present embodiment, the LED module voltage detecting unit 230 includes a voltage-dividing circuit formed by a resistor R1 and a resistor R2 connected in series, and performs a voltage-dividing operation according to the driving voltage $V_{DR}$ to produce the comparison voltage $V_{CP}$. In detail, the LED module voltage detecting unit 230 detects the driving voltage $V_{DR}$ on the LED string 110 (wherein the driving voltage $V_{DR}$ is equal to the input voltage Vin minus a voltage received by the LED module voltage detecting unit 230), and divides the voltage received by the LED module voltage detecting unit 230 to produce the comparison voltage $V_{CP}$.

Moreover, in the present embodiment, the switching signal generation unit 240 includes a switching signal control unit 310 and a switching signal driving unit 320. The switching signal control unit 310 is coupled to the fault detection pin $P_{Fault}$ for receiving the comparison voltage $V_{CP}$, and the switching signal control unit 310 compares the reference voltage $V_{REF}$ and the comparison voltage $V_{CP}$ to produce a control signal $S_{CTL}$. The switching signal driving unit 320 is coupled to the switching signal control unit 310, and the switching signal driving unit 320 enables or disables the switching signal $S_{SW}$ according to the control signal $S_{CTL}$.

Figure 4:
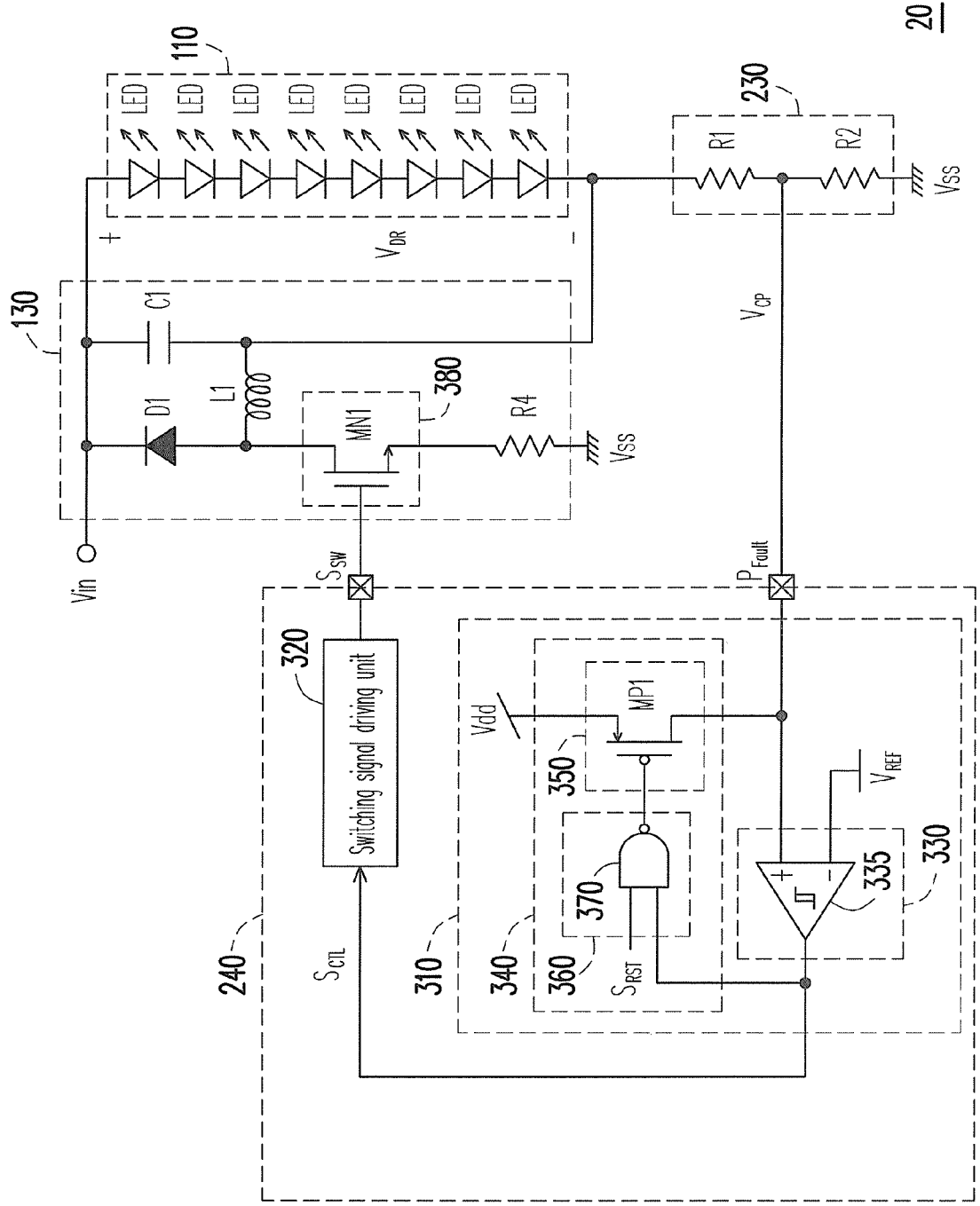
FIG. 4 is diagram illustrating a circuit structure of a LED module driving device according to a first embodiment of the invention.

To further convey the spirit of the invention to those skilled in the art, a circuit structure and an operation flow of the LED module driving device 20 are described in detail below. Referring to FIG. 4, FIG. 4 is diagram illustrating a circuit structure of the LED module driving device 20 according to the first embodiment of the invention. Referring to FIG. 4, the switching signal control unit 310 includes a comparator unit 330 and an active pull up circuit 340. In the present embodiment, the compare unit 330 is implemented by a hysteresis comparator 335, though the invention is not limited thereto. A first input terminal of the comparator unit 330 (for example, an inverting input terminal of the hysteresis comparator 335) receives the reference voltage $V_{REF}$, and a second input terminal of the comparator unit 330 (for example, a non-inverting input terminal of the hysteresis comparator 335) is coupled to the fault detection pin $P_{Fault}$ for receiving the comparison voltage $V_{CP}$. The comparator unit 330 compares voltage levels of the reference voltage $V_{REF}$ and the comparison voltage $V_{CP}$, and produces the control signal $S_{CTL}$ at an output terminal of the comparator unit 330.

Referring to FIG. 4 again, the active pull up circuit 340 includes a switch 350 and a logic operation unit 360. The switch 350 is, for example, a P-type metal oxide semiconductor (PMOS) transistor MP1. A first end of the switch 350 (for example, a source of the transistor MP1) is coupled to a logic high level voltage Vdd, and a second end of the switch 350 (for example, a drain of the transistor MP1) is coupled to the fault detection pin $P_{Fault}$. The logic operation unit 360 is, for example, an NAND gate 370. A first input terminal of the logic operation unit 360 (for example, an input terminal of the NAND gate 370) receives the control signal $S_{CTL}$, a second input terminal of the logic operation unit 360 (for example, another input terminal of the NAND gate 370) receives a reset signal $S_{RST}$, and an output terminal of the logic operation unit 360 (for example, an output terminal of the NAND gate 370) is coupled to a control end of the switch 350 (for example, a gate of the transistor MP1). Moreover, the reset signal $S_{RST}$ is used for resetting the LED module driving device 20 after the damaged LED string 110 is repaired by a maintenance personnel.

Figure 5:
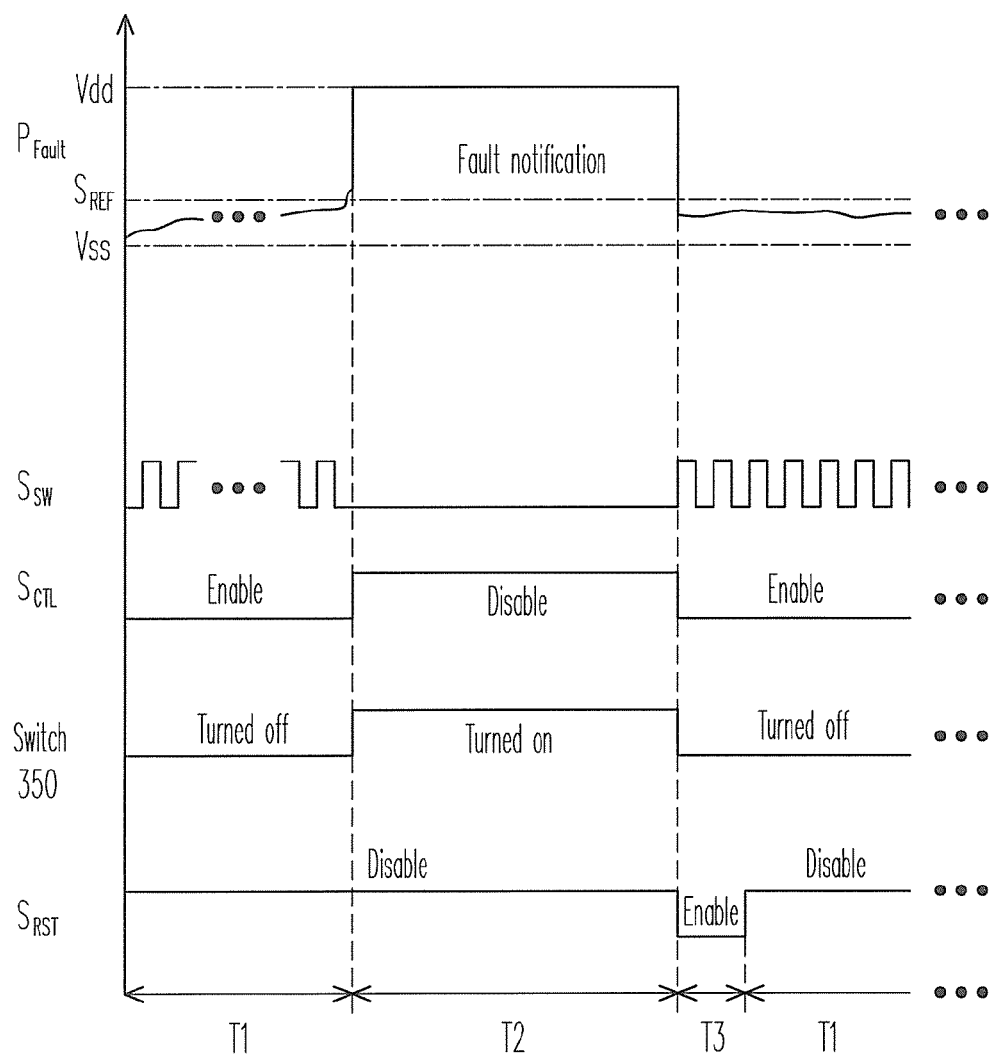
FIG. 5 is a diagram illustrating signal waveforms according to a first embodiment of the invention.

Actuating methods of the reset signal $S_{RST}$, the voltage level on the fault detection pin $P_{Fault}$, and the active pull up circuit 340 are described below. Referring to FIG. 4 and FIG. 5, FIG. 5 is a diagram illustrating signal waveforms according to the first embodiment of the invention. As shown in FIG. 5, during a period T1, i.e. when the LED module driving device 20 is normally operated, most of the driving voltage $V_{DR}$ is consumed on the LED string 110, and now the comparison voltage $V_{CP}$ is smaller than the reference voltage $V_{REF}$. When the comparison voltage $V_{CP}$ is smaller than the reference voltage $V_{REF}$, the control signal $S_{CTL}$, generated by the switching signal control unit 310 is an enable signal (for example, the control signal $S_{CTL}$ is a logic low level signal), so that the switching signal driving unit 320 enables the switching signal $S_{SW}$, i.e. the switching signal $S_{SW}$ carries the PWM signal. Now, the switch 350 is turned off, and the reset signal $S_{RST}$ is in a disable state (for example, the reset signal $S_{RST}$ is in a logic high level state).

Comparatively, when a part of the LEDs LED in the LED string 110 is damaged, or when a voltage received by the LED module voltage detecting unit 230 is excessively high due to other factors, the comparison voltage $V_{CP}$ is greater than the reference voltage $V_{REF}$. Therefore, when the comparator unit 330 of the switching signal control unit 310 detects that the voltage level on the fault detection pin $P_{Fault}$ is greater than the reference voltage $V_{REF}$, a period T2 is entered. The control signal $S_{CTL}$, generated by the switching signal control unit 310 is now converted from the enable signal to a disable signal (for example, the control signal $S_{CTL}$ is converted from the logic low level signal to a logic high level signal), the switching signal driving unit 320 accordingly disables the switching signal $S_{SW}$, i.e. the switching signal $S_{SW}$ generated by the switching signal driving unit 320 is a DC voltage signal (for example, the switching signal $S_{SW}$ is a logic low level signal). Moreover, after the switching signal $S_{SW}$ is disabled, a transistor MN1 is turned off, so that the voltage converting unit 130 stops a power conversion operation. Thereafter, the switch 350 in the switching signal control unit 310 is turned on in response to a logic operation result (a logic low level signal) of the logic operation unit 360 obtained according to an output (a logic high level signal) of the comparator unit 330, so as to pull up the voltage level on the fault detection pin $P_{Fault}$ to the logic high level voltage Vdd, and accordingly produce the fault notification signal. Such fault notification signal is used to notify the maintenance personnel or other responsible personnel that a part of the LEDs LED in the LED string 110 is damaged, or the LED module driving device 20 is malfunctioned due to other factors.

If the maintenance personnel has repaired the damaged LED string 110 or obviated other problems to restore the LED module driving device 20, the reset signal $S_{RST}$ can be changed from the disable state (the logic high level signal) to the enable state (the logic low level signal), and a period T3 is entered. Thereafter, the period T1 is again repeated after the period T3 is ended, and now the reset signal $S_{RST}$ is changed back to the disable state (the logic high level signal), and the switching signal generation unit 240 can continually compare the reference voltage $V_{REF}$ and the comparison voltage $V_cP$, so as to enable or disable the switching signal $S_{SW}$. Other actuating methods and flows have been described in the aforementioned embodiments, so that detailed descriptions thereof are not repeated.

The voltage converting unit 130 implemented by the DC-DC voltage converter is described in detail below. Referring to FIG. 4, the DC-DC voltage converter 130 includes a diode D1, a capacitor C1, an inductor L1, a transfer switch 380 and a transfer resistor R4. A cathode of the diode D1 receives the input voltage Vin, and is coupled to a first end of the LED string 110. A first end of the capacitor C1 receives the input voltage Vin, and a second end of the capacitor C1 is coupled to a second end of the LED string 110. A first end of the inductor L1 is coupled to an anode of the diode D1, and a second end of the inductor L1 is coupled to the second end of the capacitor C1. The transfer switch 380 is, for example, a N-type metal oxide semiconductor (NMOS) transistor MN1. A control end of the transfer switch 380 (for example, a gate of the transistor NM1) receives the switching signal $S_{SW}$, a first end of the transfer switch 380 (for example, a drain of the transistor MN1) is coupled to the anode of the diode D1 and the first end of the inductor L1, and a second end of the transfer switch 380 (for example, a source of the transistor MN1) is coupled to one end of the transfer resistor R4, and another end of the transfer resistor R4 receives the ground voltage $V_{SS}$. Those skilled in the art can deduce an actuating method of the DC-DC voltage converter 130 by themselves, so that detailed descriptions thereof are not repeated.

Figure 6:
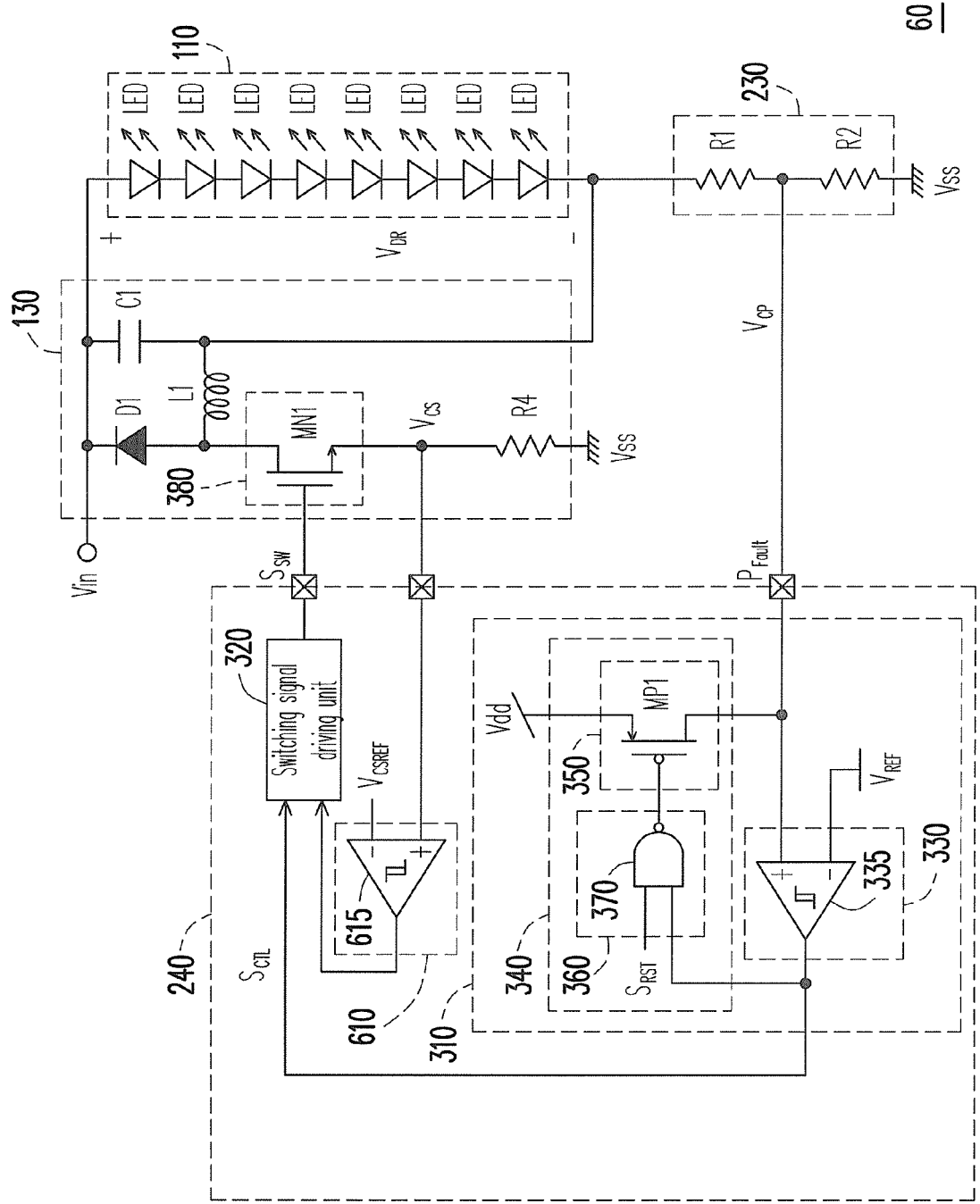
FIG. 6 is a diagram illustrating a circuit structure of a LED module driving device according to a second embodiment of the invention.

In other embodiments of the invention, the LED module driving device may further include an over current protection unit. Referring to FIG. 6, FIG. 6 is a diagram illustrating a circuit structure of a LED module driving device 60 according to a second embodiment of the invention. The present embodiment is similar to the first embodiment, so that descriptions of the same operation methods are not repeated. A difference there between is that a switching signal generation unit 640 in the LED module driving device 60 of FIG. 6 further includes an over current protection unit 610. In the present embodiment, a first receiving terminal of the over current protection unit 610 receives an over current reference voltage $V_{CSREF}$, and a second receiving terminal of the over current protection unit 610 receives an over current comparison voltage $V_{CS}$, wherein the over current comparison voltage $V_{CS}$ is obtained by dividing the input voltage Vin by the diode D1, the transistor MN1 and the transfer resistor R4 connected in series. The over current protection unit 610 can compare the over current comparison voltage $V_{CS}$ and the over current reference voltage $V_{CSREF}$, so that the switching signal generation unit 640 can accordingly disable or enable the switching signal $S_{SW}$. In other words, when the over current protection unit 610 detects that the over current comparison voltage $V_{CS}$ is greater than the over current reference voltage $V_{CSREF}$, it represents that a current flowing through the voltage converting unit 130 is excessively large, which may probably cause a damage, so that the switching signal generation unit 640 disables the switching signal $S_{SW}$ to stop the voltage converting operation of the voltage converting unit 130. In the present embodiment, the over current protection unit 610 is, for example, a hysteresis comparator 615, though the invention is not limited thereto.

Figure 7:
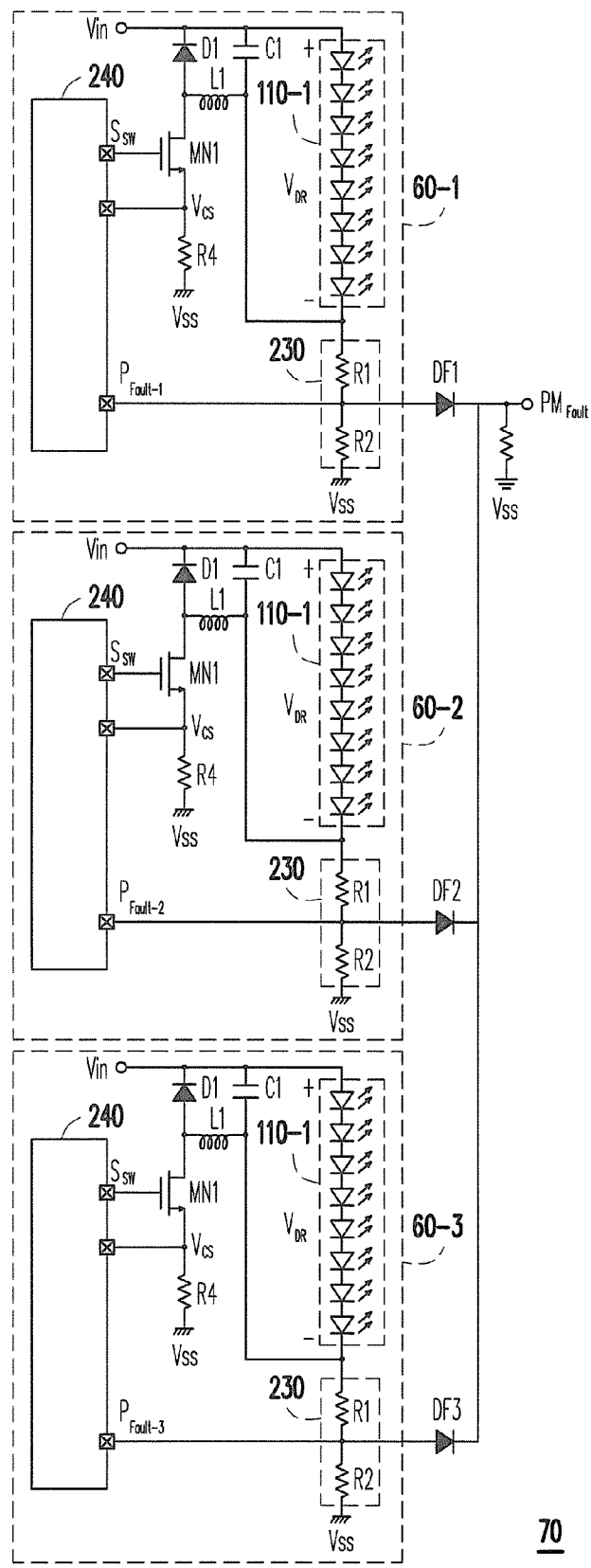
FIG. 7 is a diagram illustrating a circuit structure of a LED module according to a third embodiment of the invention.

Another embodiment of the invention provides a LED module 70 with reference of FIG. 7, and FIG. 7 is a diagram illustrating a circuit structure of the LED module 70 according to a third embodiment of the invention. Referring to FIG. 7, the LED module 70 includes LED strings 110_1-110_N, LED driving devices 60_1-60N and diodes DF1-DFN. Each of the LED driving devices 60_1-60_N corresponds to one of the LED strings 110_1-110_N, wherein N is a positive integer, and in the present embodiment, N is set to 3 for simplification. A circuit structure and an operation method of each of the LED driving devices 60_1-60_N are the same to that of the LED module driving device 60 in the second embodiment of FIG. 6, so that detailed descriptions thereof are not repeated.

A difference between the present embodiment and the aforementioned embodiment is that one end of each of the diodes DF1-DF3 is coupled to a corresponding one of fault detection pins $P_{Fault\_1}$-$P_{Fault\_3}$, and other ends of the diodes DF1-DF3 are commonly coupled to a multi fault detection pin $PM_{FAULT}$. The maintenance personnel can know whether the LED strings 110_1-110_3 are damaged or whether the LED driving devices 60_1-60_3 are malfunctioned according to a multi fault detection signal generated by the multi fault detection pin $PM_{FAULT}$. In other words, the LED module 70 can receive the fault notification signals generated by the fault detection pins $P_{Fault\_1}$-$P_{Fault\_3}$ through the multi fault detection pin $PM_{FAULT}$, so as to generate the multi fault detection signal. Moreover, other detailed operation flows of the present embodiment are included in the aforementioned embodiments, so that detailed descriptions thereof are not repeated.

In summary, an embodiment of the invention provides a driving device for a LED module, and the driving device for the LED module has a fault detection pin, which can compare voltage levels of the reference voltage and the comparison voltage to detect whether the LED module is malfunctioned. When the LED module is malfunctioned, the voltage level of the fault detection pin is pulled up to the logic high level voltage, so as to produce the fault notification signal, so that the fault detection pin also have a function for fault notification.

Moreover, the LED module of another embodiment has a plurality of LED driving devices, and each LED driving device includes the fault detection pin having a function for fault notification. In addition, the LED module integrates the fault detection pins of a plurality of the LED driving devices into a multi fault detection pin, so that when a part of the LEDs is damaged, the LED module can immediately execute the fault notification.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A driving device for a light-emitting diode (LED) module, comprising:
    a voltage converting unit, coupled to the LED module, for receiving a switching signal and producing a driving voltage according to the switching signal to drive the LED module;
    a LED module voltage detecting unit, coupled to the LED module, for detecting the driving voltage on the LED module, and performing a voltage-dividing operation according to the driving voltage to produce a comparison voltage; and
    a switching signal generation unit, coupled to the voltage converting unit and the LED module voltage detecting unit, and the switching signal generation unit has a fault detection pin for receiving the comparison voltage, wherein the switching signal generation unit compares a reference voltage and the comparison voltage to enable or disable the switching signal, and after the switching signal is disabled, the switching signal generation unit further pulls up a voltage level of the fault detection pin to a logic high level voltage, so as to produce a fault notification signal.

2. The driving device for the LED module as claimed in claim 1, wherein the switching signal is a pulse width modulation signal when the switching signal is enabled, and the switching signal is a direct current (DC) voltage signal when the switching signal is disabled.

3. The driving device for the LED module as claimed in claim 1, wherein the switching signal generation unit comprises:
    a switching signal control unit, coupled to the fault detection pin for receiving the comparison voltage, and comparing the reference voltage and the comparison voltage to produce a control signal; and a switching signal driving unit, coupled to the switching signal control unit, for enabling or disabling the switching signal according to the control signal, wherein after the switching signal is disabled, the switching signal control unit further pulls up the voltage level of the fault detection pin to the logic high level voltage, so as to produce the fault notification signal.

4. The driving device for the LED module as claimed in claim 3, wherein the switching signal control unit comprises:

a comparator unit, has a first input terminal for receiving the reference voltage, and a second input terminal coupled to the fault detection pin for receiving the comparison voltage, wherein the comparator unit compares the comparison voltage and the reference voltage to produce the control signal; and an active pull up circuit, coupled to the comparator unit, wherein when the switching signal is disabled, the active pull up circuit pulls up the voltage level of the fault detection pin to the logic high level voltage.

5. The driving device for the LED module as claimed in claim 4, wherein the active pull up circuit comprises a switch, wherein a first end of the switch is coupled to the logic high level voltage, and a second end of the switch is coupled to the fault detection pin, and after the switching signal is disabled, the switch is turned on to pull up the voltage level of the fault detection pin to the logic high level voltage.

6. The driving device for the LED module as claimed in claim 5, wherein the active pull up circuit further comprises a logic operation unit, wherein a first input terminal of the logic operation unit receives the control signal, a second input terminal of the logic operation unit receives a reset signal, and an output terminal of the logic operation unit is coupled to a control end of the switch, when the reset signal is disabled and the switching signal is disabled, the switch is turned on, and when the reset signal is enabled, the switch is turned off, so that the switching signal generation unit compares the comparison voltage and the reference voltage to disable or enable the switching signal.

7. The driving device for the LED module as claimed in claim 6, wherein the switch is a P-type metal oxide semiconductor (PMOS) transistor, and comparator unit is a hysteresis comparator, and the logic operation unit is a NAND gate.

8. The driving device for the LED module as claimed in claim 1, wherein the voltage converting unit comprises:

a diode, has a cathode for receiving an input voltage and coupled to a first end of the LED module;

a capacitor, has a first end for receiving the input voltage, and a second end coupled to a second end of the LED module;

an inductor, having a first end coupled to an anode of the diode, and a second end coupled to the second end of the capacitor; and a transfer switch, has a control end for receiving the switching signal, a first end coupled to the anode of the diode and the first end of the inductor, and a second end coupled to one end of a transfer resistor, wherein another end of the transfer resistor receives a ground voltage.

9. The driving device for the LED module as claimed in claim 8, wherein the switching signal generation unit further comprises:

an over current protection unit, having a first receiving terminal receiving an over current reference voltage, and a second receiving terminal coupled to one end of the transfer resistor for obtaining an over current comparison voltage, wherein the over current comparison voltage is obtained by dividing the driving voltage, and the over current protection unit compares the over current comparison voltage and the over current reference voltage, so that the switching signal generation unit accordingly disables or enables the switching signal.

10. The driving device for the LED module as claimed in claim 1, wherein the LED module is a LED string, and the LED string comprises at least one LED.

11. A light-emitting diode (LED) module, comprising:

a plurality of LED strings;

a plurality of LED driving devices, each LED driving device being correspondingly coupled to one of the LED strings, and each LED driving device comprising:

a voltage converting unit, coupled to the corresponding LED string, for receiving a switching signal and producing a driving voltage according to the switching signal to drive the corresponding LED string;

a LED module voltage detecting unit, coupled to the corresponding LED string, for detecting the driving voltage on the LED string, and performing a voltage-dividing operation according to the driving voltage to produce a comparison voltage; and a switching signal generation unit, coupled to the voltage converting unit and the LED module voltage detecting unit, and having a fault detection pin for receiving the comparison voltage, wherein the switching signal generation unit compares a reference voltage and the comparison voltage to enable or disable the switching signal, and after the switching signal is disabled, the switching signal generation unit further pulls up a voltage level of the fault detection pin to a logic high level voltage, so as to produce a fault notification signal; and a plurality of LEDs, one end of each LED being coupled to the corresponding fault detection pin, and other ends of the LEDs being commonly coupled to a multi fault detection pin, wherein the multi fault detection pin produces a multi fault detection signal.

12. The LED module as claimed in claim 11, wherein the switching signal is a pulse width modulation signal when the switching signal is enabled, and the switching signal is a direct current (DC) voltage signal when the switching signal is disabled.

13. The LED module as claimed in claim 11, wherein the switching signal generation unit comprises:

a switching signal control unit, coupled to the fault detection pin for receiving the comparison voltage, and comparing the reference voltage and the comparison voltage to produce a control signal; and a switching signal driving unit, coupled to the switching signal control unit, for enabling or disabling the switching signal according to the control signal, wherein after the switching signal is disabled, the switching signal control unit further pulls up the voltage level of the fault detection pin to the logic high level voltage, so as to produce the fault notification signal.

14. The LED module as claimed in claim 13, wherein the switching signal control unit comprises:

a comparator unit, having a first input terminal receiving the reference voltage, and a second input terminal coupled to the fault detection pin for receiving the comparison voltage, wherein the comparator unit compares the comparison voltage and the reference voltage to produce the control signal; and an active pull up circuit, coupled to the comparator unit, wherein when the switching signal is disabled, the active pull up circuit pulls up the voltage level of the fault detection pin to the logic high level voltage.

* * * * *